Figure 1:
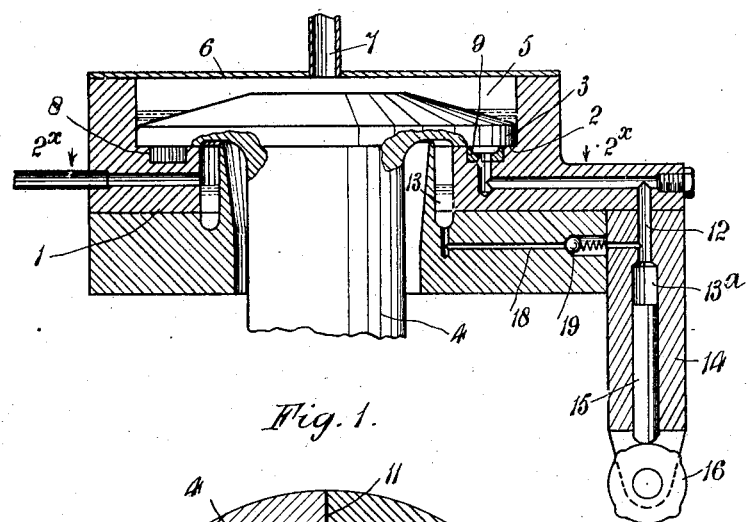

May 20, 1930.   W. NOBLE   1,759,412
BEARING
Filed March 10, 1927

Inventor
Warren Noble.

By

Attorney

Patented May 20, 1930

1,759,412

UNITED STATES PATENT OFFICE

WARREN NOBLE, OF DETROIT, MICHIGAN

BEARING

Application filed March 10, 1927. Serial No. 174,296.

This invention relates to bearings, more particularly thrust bearings, where substantial friction or thrust offers a high resistance to initial movement of a rotary member of the bearing, and has for its object to provide a simple and expedient means which will operate to initially relieve the frictional surfaces to an extent sufficient to materially facilitate commencement of rotation of the movable element or elements of the bearing. Various mechanical methods have been suggested from time to time for overcoming this resistance to initial movement of a bearing element, and the present invention has as an object the avoidance of such mechanical complications or auxiliary devices, and the effecting of the overcoming of the initial friction by hydraulic means adapted to relieve pressure of the contacting bearing surfaces.
It is well known that two surfaces pressed against one another, however smooth, have certain interlocking surface irregularities which set up resistance against relative movement, and such resistance may be overcome sufficiently to permit relative movement of the parts to commerce by vibrating one or other of the bearing elements, whereupon friction therebetween is temporarily relieved and relative movement permitted. When such movement has been initiated the resistance to continued movement is much lower. The present invention, therefore, also has as an object a promoting of vibration in one or other, or both of bearing elements by hydraulic means, for the purpose of permitting such relative movement of the member effected.

A further object is to utilize as the vibrating means hydraulic fluid in the form of lubricant, which will lubricate, or assist in the lubrication of, the bearing when relative movement of the members takes place.

Still further objects or advantages subsidiary or incidental to the aforesaid objects, or resulting from the construction or operation of the invention as it may be carried into effect, will become apparent as the said invention is hereinafter further disclosed.

Figure 2:
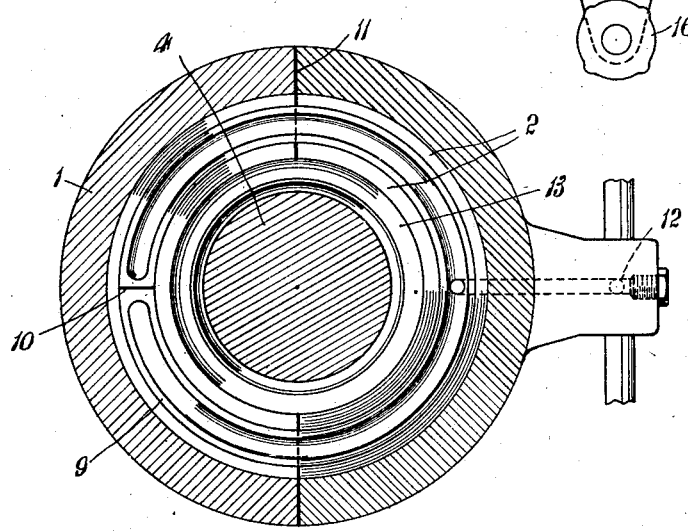

In carrying the said invention into effect, I may provide in a bearing, including a stationary and a rotary element supported by the stationary element, a duct or channel between the opposed faces of the two elements and supplied through a closed passage with oil, the column of oil in said duct and passage being closely confined and subjected to the action of a plunger or hammer operated by a cam at high speed and, when rotation of the rotary element is to be effected, effecting vibration of the plunger by the operation of said cam whereby such vibration will be transmitted through said oil to the opposed members of the bearing and simultaneously set up a vibratory movement in the said members, said movement operating against said members in opposite directions and temporarily relieving the friction therebetween, whereby rotation of the rotary member is facilitated. All of which is more particularly described and ascertained hereinafter, by way of example, having reference to the accompanying drawing, wherein:

Figure 1 is a, more or less, diagrammatic sectional elevation of a thrust bearing, embodying the said invention; and Figure 2 is a horizontal section of the same taken on the line $2^x$—$2^x$, Figure 1.

Similar characters of reference indicate similar parts in both figures of the drawing.

The bearing is indicated as including a stationary member or housing 1 against the surface 2, of which a rotary member 3 abuts, the said rotary member being in this instance shown as the end flange of a shaft 4, and accommodated in a recess or oil well 5 in the said housing 1.

The housing is provided with a cover plate 6 having an inlet pipe 7 through which lubricating oil may be supplied to the said bearing for running purposes, when necessary.

For starting purposes the face 2 of the stationary member 1 is provided with an annular recess 8 in which is accommodated a channelled annulus 9 divided at 10, the channel thereof terminating short of the division point. This annulus is provided where the bearing member is divided as at 11 in order to avoid leakages at said division 11 and then ensure continuity in the channel.

12 is a conduit leading from an oil chamber $13^a$ formed in a suitable casing or extension

14 of the bearing, and 15 is a plunger extending into the said chamber and actuated by a cam 16, which is rotated by any suitable means. The lift of this cam is quite small, but it is adapted to operate the plunger at high frequency, and the column of oil in the chamber 13ª and duct 12 and the recess of the annulus 9 is intended to be solid, so that vibration of the plunger by the cam is transmitted to the surface of the bearing member 3, closing the open side of the channel of the said annulus 9, and incidentally transmitted in the opposite direction to the stationary member 1 of the bearing through walls of the annulus. In other words, the oil in the recess of the annulus is subjected to frequent high pressure impulses.

This vibration may be of such force and frequency that it will effectually overcome thrust or friction resisting initial movement of the rotary element of the bearing, and it may be maintained a sufficient length of time to permit such motion to progress to an extent admitting the operation of the bearing at an efficient speed at which its resistance to movement is very much lower than its resistance to the commencement of any movement.

Any suitable means may be employed for keeping the column of oil complete, so that vibration thereof will be properly transmitted to the bearing surfaces, and, as an example of such means, an overflow well 13 is shown supplied with overflow oil from the bearing, this well communicating, through a duct 18 and check valve 19, with the duct 12 for the supplying of oil to the operating column as such supply may be required.

The hydraulic fluid or oil in the recess of the annulus 9 forms a hydraulic gasket, and the said hydraulic gasket, the column of oil in the duct and chamber 12 and 13ª, together with the plunger 16 and its operating means, form a hydraulic hammer operating against the opposed faces of the members 1 and 3.

This invention may be developed within the scope of the following claims without departing from the essential features of the said invention, and it is desired that the specification and drawing be read as being merely illustrative and not in a limiting sense, except as necessitated by the prior art.

What I claim is:—

1. In a bearing, a stationary member, a rotary member, said members having opposed thrust faces, and means transmitting vibration to one of said members to temporarily relieve friction therebetwen.

2. In a bearing, a stationary member, a rotary member, said members having opposed thrust faces, and means vibrating said members in opposite directions to relieve thrust therebetween.

3. In a bearing, a stationary member, a rotary member, said members having opposed thrust faces, a hydraulic gasket between said faces, and means vibrating said hydraulic gasket to vibrate said members for the relieving of friction therebetween.

4. In a bearing, a stationary member, a rotary member, said members having opposed thrust faces, and a hydraulic hammer operating against the opposed faces of said members to set up friction-relieving vibration therein.

5. In a bearing, a stationary member, a rotary member, said members having opposed thrust faces, one of which is recessed to provide an oil chamber, a plunger confining oil within said chamber, and means for vibrating said plunger to transmit vibration through said oil to the opposed faces of said members.

6. In a bearing, a stationary member, a rotary member, said members having opposed thrust faces, a hydraulic gasket between said faces, and means applying frequent high pressure impulses to said hydraulic gasket to produce a hammering effect.

7. In a bearing, a stationary member, a rotary member, said members having opposed thrust faces, a plunger confining a closed column of oil between the faces of said members and said plunger, and means applying frequent high pressure impulses of oil through said plunger to produce a hammering effect.

8. In a bearing, a stationary member, a rotary member, said members having opposed thrust faces, said members being provided with a space between said faces, means housing a column of incompressible fluid communicating with and filling such space, and vibrating means operating against a closed end of said column, whereby vibrations are transmitted through said column to the opposed faces of said bearing and means operating said vibrating means.

In testimony whereof I affix my signature.

WARREN NOBLE.